United States Patent
Wood

[11] 3,724,582
[45] Apr. 3, 1973

[54] MOTORCYCLE CHAIN GUARD

[76] Inventor: George R. Wood, 528½ East Fairview, Inglewood, Calif. 90302

[22] Filed: Oct. 18, 1971

[21] Appl. No.: 190,252

[52] U.S. Cl. ............... 180/33 R, 74/611, 184/15 R, 280/261
[51] Int. Cl. ............................................. B62j 13/04
[58] Field of Search ............. 180/33 R, 32; 74/611; 184/15 R; 280/261, 289

[56] References Cited

UNITED STATES PATENTS

| 1,301,258 | 4/1919 | Harley | 184/15 R |
| 2,029,079 | 1/1936 | Miller | 184/15 R |
| 3,012,632 | 12/1961 | Bradley | 184/15 R |

FOREIGN PATENTS OR APPLICATIONS

| 175,045 | 5/1904 | Germany | 184/15 R |
| 289,984 | 11/1931 | Italy | 280/289 |

*Primary Examiner*—Kenneth H. Betts
*Attorney*—William H. Pavitt, Jr. et al.

[57] ABSTRACT

An oil splash cover for a motorcycle which comprises an elongated U-shaped upper housing section and a similarly configured inverted lower housing section spaced from each other along most of their lengths by brackets, and brought together and bolted at their trailing ends. The forward ends of the thus-held housing sections rest upon motorcycle frame members and the brackets securing the upper and lower housing sections in their spaced relationship are looped and fitted around a swinging arm for the cycle's rear wheel to support the housing in relation to said arm. A chain guide is mounted at a forward position to guide a broken end of the chain around a front sprocket. The two housing sections are configured along their edges adjacent the rear wheel axle to provide a larger opening. The lower housing section is further orificed to receive the end of an oiler tube and to locate said end above the lower portion of the chain loop to drip oil on the chain. The tube extends upwardly to an oil reservoir disposed below the motorcycle seat or on top chain cover, the reservoir being provided with a manual valve means to regulate the oil drips through the tube and onto the chain. An oil drip drain is also provided at the trailing end of the rear section.

3 Claims, 3 Drawing Figures

PATENTED APR 3 1973 3,724,582
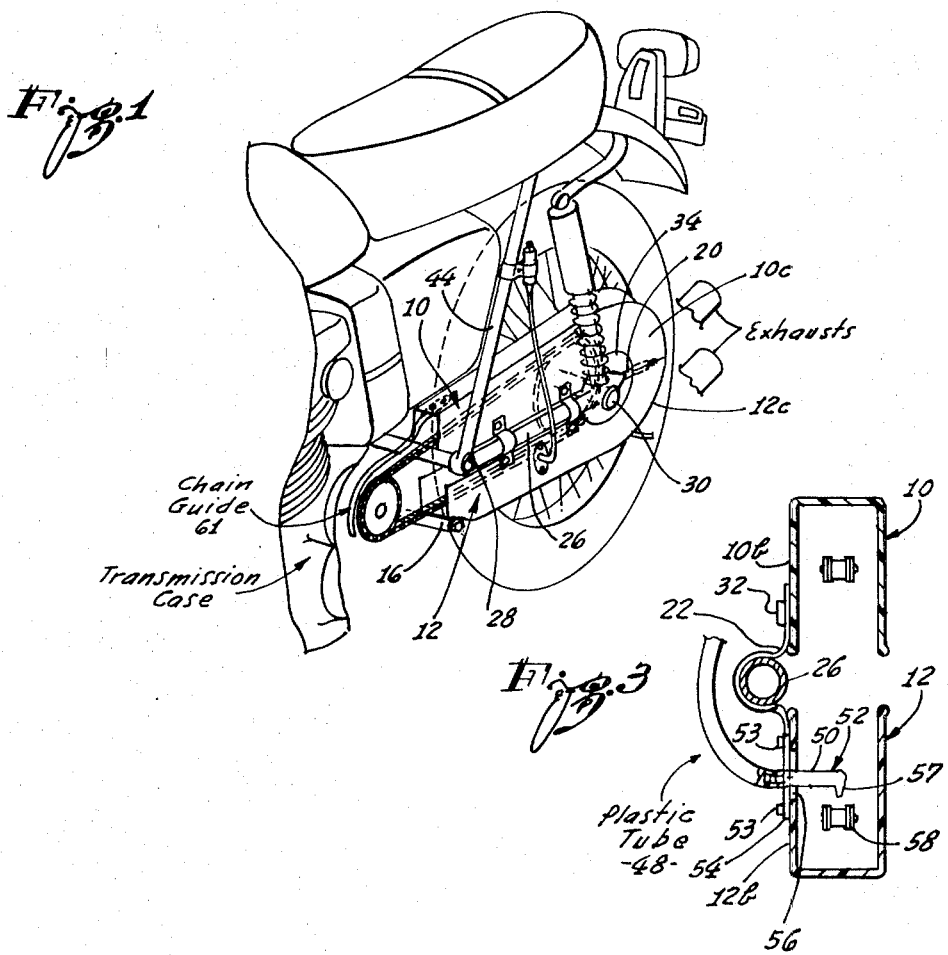
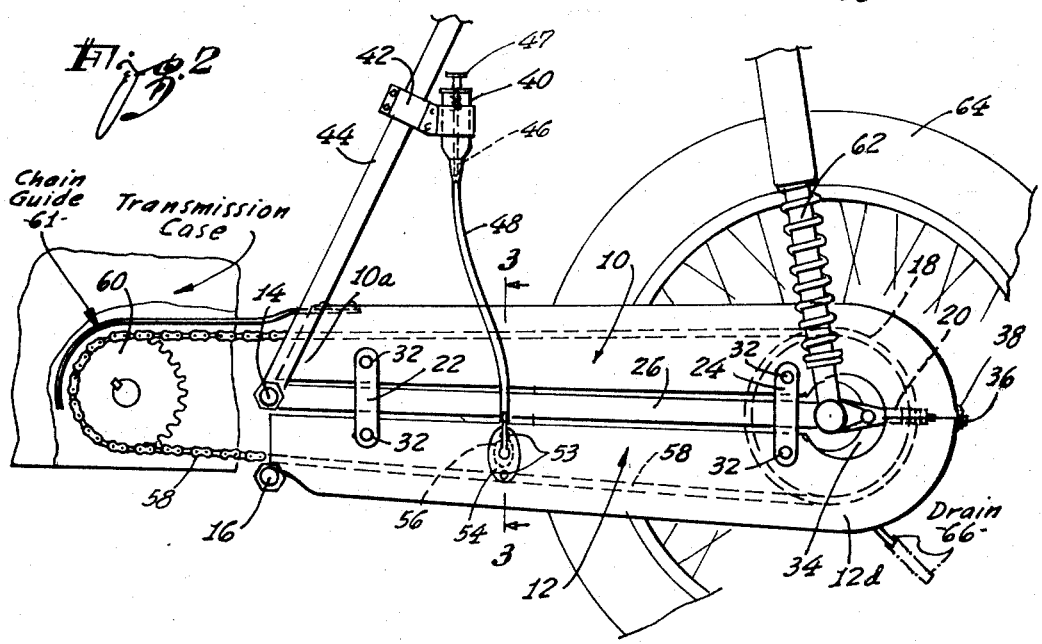

MOTORCYCLE CHAIN GUARD

BACKGROUND OF THIS INVENTION

1. Field of the Invention

This invention relates to chain covers for cycle-type machines, and particularly to lubricating chain covers for motorcycles.

2. Description of the Prior Art

Many models of motorcycles have heretofore been provided with some type of chain guard or covers. However, such prior art guards have not made any provision for continuous lubrication of the chain and they have been ineffective in preventing whatever oil is placed on the chain from being thrown up and onto the clothes of the cyclist. Nor have prior art guards been effective to inhibit the accumulation of sand, dirt or other grit which tends to cause wear on the chain. As a result, chain life is usually figured by the cyclist to be about 6,000 miles. Efforts to increase this chain life by regular cleaning and lubrication of his cycle chain usually result in the cyclist finding oil thrown up on his clothing.

In addition, prior art chain guards or covers have been largely ineffective in preventing a ruptured chain from damaging the adjacent motorcycle wheel or even preventing it from flying up to injure the cyclist. At high speeds, chain rupture represents a real hazard. Thus, the high-speed cyclist should ordinarily look to replacing his drive chain not much after 5,000 miles of driving in order to be safe.

Where prior art chain guards or covers have sought to provide a fairly complete covering of the moving chain, they have made it difficult for the cyclist to lubricate the chain and regularly to check the condition of the chain. Also, chains will tend to "run hot" in such closed chain housings. Prolonged operation of the motorcycle at high speeds can produce great elevation of the temperature of the chain and thereby increase the danger of its rupture through metal fatigue.

Another problem with prior art chain guards or covers is their tendency to interfere with other parts of the motorcycle such as the chain tensioner and frame members.

SUMMARY OF THE INVENTION

The present invention obviates all of the problems encountered with prior art chain guards or covers by constructing the chain guard of a pair of U-shaped housings which extend from a motorcycle frame member below the seat and upon which frame member the forward ends may be supported, to a point rearwardly of the rear wheel chain sprocket and any tensioner which may extend aft therefrom. The two housings aligned with their respective edges opposed to each other, but are spaced apart in parallel relationship and maintained in such relationship by brackets secured to their respective sides and looped over one of the swing arms which support the rear axle of the motorcycle to be supported by such arm. Axially adjacent the rear wheel chain sprocket, the edges of the U-shaped housings are configured to provide a curved and greater opening between the respective edges. One of the housings is orificed and provided with a removable orificed plate through which the end of an oiler tube may be passed to drip oil onto the chain. The other end of the tube is connected to valving means from an oil reservoir located beneath the motorcycle seat. The trailing ends of the housings desirably may be bolted together.

While a chain guard or cover so constructed provides an almost closed housing, there is sufficient air spacing to allow the working chain to be adequately ventilated so that it will tend to run much cooler than where it is completely enclosed.

The enclosure provided by the chain of the present invention is, however, adequate to keep out much of the sand, dirt and other grit which tends to get into the chain where it is not shielded. Moreover, provision is made for continuous periodic lubrication of the chain while at the same time the lubrication is prevented from being thrown up onto the clothes of the cyclist.

As a consequence of these features of a chain guard constructed in accordance with the present invention, chain life should be substantially increased to almost double what may be expected of chains with or without presently available chain guards. Moreover, the chain guard of the present invention does not interfere with the other parts of the motorcycle and may be constructed to sell at a reasonable and acceptable price.

BRIEF DESCRIPTION OF THE DRAWINGS

FIG. 1 is a perspective view of a chain guard mounted on the rear end of a motorcycle.

FIG. 2 is a side elevation of the chain guard shown in FIG. 1.

FIG. 3 is a section taken of the line 3—3 of FIG. 2.

DESCRIPTION OF THE PREFERRED EMBODIMENTS

Refering to the drawings, the chain guard of the present invention is constructed of a pair of U-shaped upper and lower housing 10, 12, each of which extend rearwardly from cross-frame members 14, 16 to a point aft of the rear motorcycle sprocket 18 and the chain tensioner 20. The forward end 10a of the upper housing desirably rests on and is supported by the cross-frame member 14 and the forward end 12a of the lower housing 12 may rest upon and be supported by the midstand bolt 16. The upper and lower housings 10, 12 are maintained in spaced parallel relation to each other by brackets 22, 24, which extend between and are secured to a side 10b, 12b, of each of the housings 10, 12, respectively. As may best be seen in FIG. 3, each bracket 22, 24 is looped outwardly and circularly to fit around the swinging arm 26 which extends from the frame swivel 28 rearwardly to support the rear wheel axle 30. The bracket 22, 24 may be secured to the housing sides 10b, 12b by bolts or screws 32. The after portions of the housings 10, 12 are configured axially opposite the axle 30 to provide a curved open area 34 and the trailing ends 10c, 12c of the housings 10, 12, respectively, are preferably brought together and molded to provide a registering terminal projection 36 through which a screw 38 may be passed in order to secure the two ends 10c, 12c together.

In order to provide lubrication for the chain a reservoir in the form of an inverted bottle 40 may be attached by a claim 42 to the seat frame support 44. This bottle reservoir 40 may be capped by a manual pull valve 46 the outlet of which is connected to a flexible tube 48. The tube 48 extends downwardly to the inlet end 50 of a spigot 52 which passes through an eliptical plate 54 removably secured to cover a similarly configured opening 56 in the side 12b of the lower housing 12. The discharging nozzle 57 of the spigot 52 is directed downwardly and is directly over the chain 58 in its lower course around the sprockets 18 and 60.

A chain guide 61 is mounted at a forward position on the upper housing 10 and extends around the chain 58 and the sprocket 60. If the chain breaks, the guide 61 prevents the broken end of the chain 58 from whipping forward and breaking the transmission case. The broken end is guided around the sprocket 60 to be deposited in the cover.

In use the housing 10 may be slipped in between the rear shock absorber 62 and the wheel 64 and located so that its forward end rests upon the cross-frame member 14. The lower housing member 12 may then be brought up from below and secured to the upper housing 10 by screwing the brackets 22 and 24 into the sides 10b and 12b of the housings 10, 12. At this time, the brackets 22, 24 are looped over the swing arm 26 so that when the brackets are thus secured to the sides 10b, 12b of the housings 10, 12, the two housings are maintained in spaced parallel relation to each other and are largely supported by the swing arm 26. The forward end 12a of the housing 12 is also disposed to be supported by the midstand bolt 16. In addition, the trailing ends of the housings 10, 12 are secured by inserting the screw 38 into the orificed terminal projection 36 and tightening it down.

The eliptical plate 54 with the spigot 52 may then be placed over the orifice 56 and secured by the bolts or screws 53. The tube 48 may be attached to the inlet end of the spigot 52 and connected to the outlet of the valve 46 which caps the inverted bottle reservoir 40. By pulling the valve cock 47 the operator of the motorcycle may regulate the amount of lubricant which passes from the reservoir into the tube 48 and thence through the spigot 52 to drip onto the chain 58. The amount of lubricant which most desirably should be passed onto the chain is normally a function of the speed at which the motorcycle is being operated and the time during which such speed is continued. In the event that the operator should desire to check the condition of the motorcycle's chain 58, he may simply remove the eliptical plate 54 from the side 12b of the lower housing 12 and feel the condition of the chain with his fingers. In the event that there is excess oil on the chain it will normally be dropped into the lower rear area 12d of the hower housing 12 and will pass out through the flexible drain tube 66. However, even if excessive lubricant should be dripped on the chain 58 it will be found that the cofiguration of the housing will permit the chain from throwing up any oil on the clothes of the cyclist. On the other hand, while the chain is thus adequately shielded, the spacing between the opposite edges of the housings 10, 12 is such, particularly when coupled with the curved open area 34, as to quite adequately ventilate the chain 58 when working on the sprockets 18 and 60 to prevent overheating. The particular chain guard shown in the drawing is one which is adapted specifically for a Honda 750 motorcycle, but the principles of construction of such a housing may readily be applied to providing chain guards for most other types of motorcycles.

I claim:

1. A motorcycle chain guard for a motorcycle including a frame with a lower midframe cross member, an engine and a rear wheel mounted on an axle extending between the rear ends of a pair of swing arms and driven by a chain extending between a first sprocket on the engine drive shaft and a second sprocket on said rear wheel, said chain guard comprising:
   A. An upper U-shaped elongated shell extending from the motorcycle's lower midframe cross member to a point beyond the rear wheel chain sprocket and any chain tensioner extending rearwardly therefrom;
   B. A lower U-shaped elongated shell of similar extent to that of the upper shell;
   C. A plurality of bracket means, each said means being secured between one side of the said upper shell and a side of the said lower shell to secure said shells in opposed parallel spaced relationship to each other about the exposed portion of the motorcycle chain which extends rearward from the engine to the second sprocket, said bracket means adjacent the swinging arm being closely looped about said arm to provide some support for the two thus-secured shells therefrom;
   D. The forward ends of said thus-secured shells resting upon a cross frame member for further support therefrom, and said shells being secured together at their trailing ends;
   E. Said shells being configured along their adjacent edges axially opposite the rear wheel axle to provide a greater ventilating spacing about the sprocket;
   F. An oil reservoir mounted beneath the motorcycle seat, said reservoir including a tube extending downwardly therefrom and controllable valve means to regulate the quantity of the oil which is passed from the reservoir into said tube;
   G. One of said shells having a removable plate, said plate being orificed to pass therethrough the lower end of said tube and to dispose the same to drip oil upon the chain; and
   H. The lower shell being orificed in its lowermost rear area to vent oil accumulated therein rearwardly therefrom.

2. The chain guard as described in claim 1, wherein a venting tube extends rearwardly from said orifice in said lowermost rear area of the lower shell.

3. The chain guard as described in claim 1, wherein the rear ends of the said shells are brought together, are threadedly orificed in registry and secured to each other by screws.

* * * * *